D. AND O. J. REISER.
AUTOMOBILE THEFT INDICATOR.
APPLICATION FILED APR. 2, 1921.
1,408,032.
Patented Feb. 28, 1922.
2 SHEETS—SHEET 1.
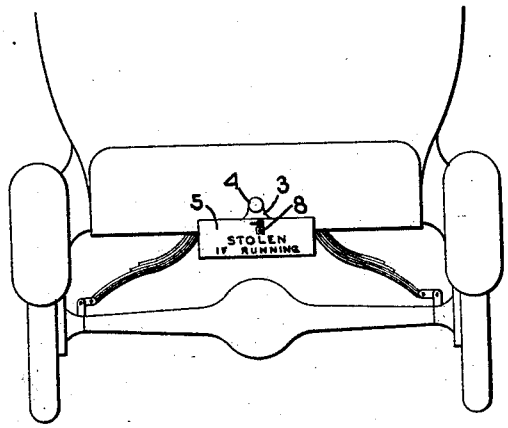
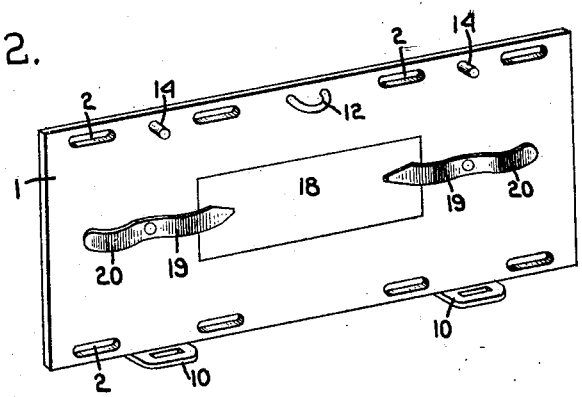
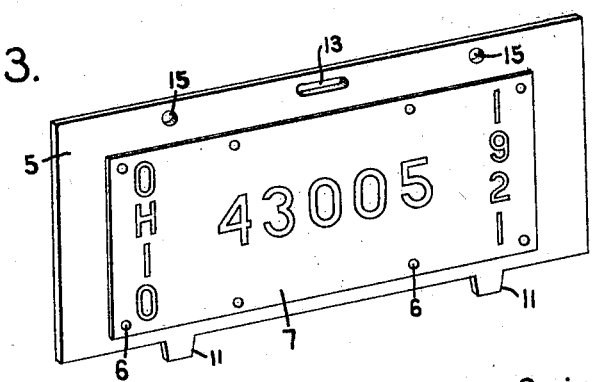
INVENTORS.
Orin J. Reiser
Daniel Reiser
BY
ATTORNEY.

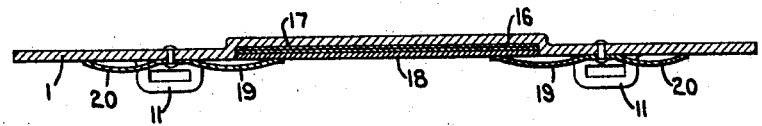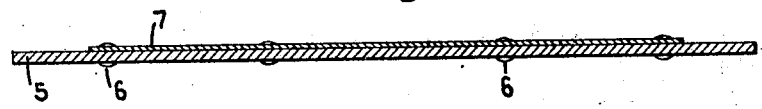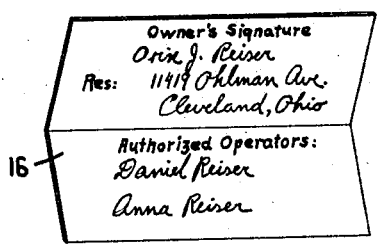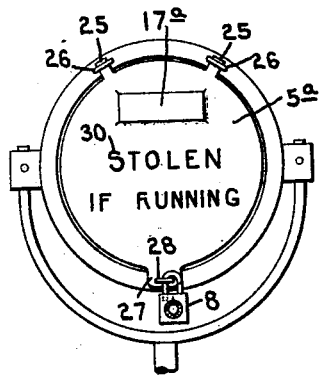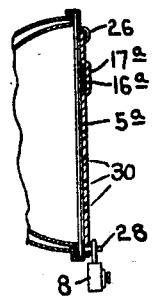

UNITED STATES PATENT OFFICE.

DANIEL REISER AND ORIN J. REISER, OF CLEVELAND, OHIO.

AUTOMOBILE THEFT INDICATOR.

1,408,032.                    Specification of Letters Patent.        Patented Feb. 28, 1922.

Application filed April 2, 1921. Serial No. 458,111.

*To all whom it may concern:*

Be it known that we, DANIEL REISER and ORIN J. REISER, citizens of the United States, residing at Cleveland, in the county of Cuyahoga and State of Ohio, have invented a certain new and useful Improvement in Automobile Theft Indicators, of which the following is a full, clear, and exact description, reference being had to the accompanying drawings.

This invention relates to theft indicating and ownership establishing devices for vehicles and has for its object the provision of a device whereby unauthorized operation of a vehicle can be indicated and restrained and whereby the identity of its owner or licensed operator can readily be established. Other objects of the invention are the provision of a protected carrier for an identification tablet; provision of a new and improved license number support; the provision of means whereby the theft indicating feature may not embarrass the legitimate operator of the car; while further objects and advantages of the invention will become apparent as the description proceeds.

In the drawings accompanying and forming a part of this application we have shown certain illustrative embodiments of our said invention, although without intent to limit ourselves to the particular features of construction and arrangement except as specifically recited in our claims. In these drawings Fig. 1 represents a rear elevation of an automobile having our improvement applied thereto; Fig. 2 is a perspective view of our improved license-number support; Fig. 3 is a similar view of the removable plate employed therewith and having the official license tag secured thereto; Fig. 4 is a longitudinal sectional view through the license-number support and Fig. 5 a similar view through the tag support and tag; Fig. 6 is a perspective view of the identification member removed and open; Fig. 7 illustrates a part of our improvement as applied to one of the headlights of a vehicle; and Fig. 8 is a vertical sectional view of the parts shown in Fig. 7.

Describing the parts by reference characters, 1 represents a metal plate having suitable apertures 2—2 whereby it may be secured to either the front or rear end of an automobile, using the provisions ordinarily employed for the attachment of the official license tag. In Fig. 1 this plate is shown as attached to the rear end license bracket 3 which is generally located beneath the tail lamp 4. Removably secured to the forward face of the plate 1 is a second plate 5 to one side of which is rigidly attached, as by rivets 6—6, the official license tag 7. The attaching means whereby the plate 5 is secured to the plate 1 includes a locking device which can be operated by the owner or licensed operator but not by strangers. Preferably this consists of a pad-lock 8 which may desirably be of the combination type, although a key padlock or any other equivalent device may be used. We have here shown the plate 1 as formed at the one side with slotted ears 10—10 adapted to receive the lugs 11—11 formed on the plate 5, one of the plates also being formed with a staple 12 adapted to traverse the slot 13 in the other plate for the reception of the padlock. We have also shown the plates as formed with interfitting studs 14 and apertures 15 whereby they can additionally be held in alignment. The side of the plate 5 opposite the license tag is provided with an inscription such as "stolen if running" or other legend calling attention to the unlicensed operation of the machine; the purpose being that the owner or authorized driver reverses this plate upon parking the machine and restores the plate on returning thereto. The plate 5 is preferably larger than the license tag so that the latter may not cover the slot 13 or apertures 15; and is also preferably at least as large as the plate 1 so as to cover the slots 2 and prevent unauthorized removal of the latter plate. In order to provide a mode whereby the owner or authorized operator can establish his identity and authority in case he shall forget to restore the license plate to its proper position before starting his car, we provide one of the plates with a concealed identification member. This may take the form of the owner's signature engraved directly upon the face of the plate 1, or upon a suitable panel carried thereby; but preferably takes the form of a card or slip 16 carried in a pocket 17 formed in the plate 1 and held in place by a suitable lid 18 in such wise as to be sufficiently shielded from the elements. This lid may be secured in any desirable way, the mode here employed comprising spring fingers 19—19 provided with extensions 20—20 and having the double purpose of securing the lid 18 in place and of holding the plate 5 against rattling.

A theft indicator of the type described can be applied to other parts of the machine, as for example to the headlight as shown in Fig. 7. In this case we have shown the plate 5ᵃ as circular and adapted to fit over the headlight glass, its margins being provided with a pair of spaced fingers 25—25 adapted to enter the staples 26—26 carried by the headlight and also with the slotted ear 27 adapted to receive the staple 28 and to be secured thereon by the padlock 8, which is here shown as of the combination type. The legend carried by the plate is in this case outlined by perforations as indicated at 30 so as to be visible either night or day; and to enable the owner or authorized user to establish his identity we have shown the plate as formed with a rearwardly opening pocket 17ᵃ receiving a card or tablet 16ᵃ of the general type heretofore described. It will be understood that an indicator of this general type can be applied to a great many other places on an automobile so that we do not limit ourselves merely to the examples shown; it will also be understood that the theft-indicator can be employed without the identification features, and that the identification features can be employed without the theft indicator. In fact it is very desirable to have an identification card deposited in some safe and protected place about the car where it can be reached only by the person or persons authorized. Accordingly we do not limit ourselves in any way except as specifically recited in the annexed claims.

Having thus described our invention what we claim is —

1. A license tag support for automobiles comprising a metal plate secured to the automobile, and a second plate removably secured to the first plate, said second plate having on one side a legend indicating that the car if moving is being operated without authority and having an official license tag secured to the opposite side thereof, in combination with means including a padlock for detachably securing said plates together.

2. A license tag support for automobiles comprising a metal plate secured to the automobile, and a second plate removably secured to the first plate, said second plate having on one side a legend indicating that the car if moving is being operated without authority and having an official license tag secured to the opposite side thereof, in combination with means including slotted ears and co-acting lugs together with a padlock, for detachably securing said plates together.

3. A license tag support for automobiles comprising a metal plate having in its face a recess to receive a lid and a removable panel adapted to contain an identification card beneath said lid, a second plate removably secured to the face of said first plate so as to cover said lid, the lid and card being entirely hidden from view when so covered, said second plate adapted to have an official license tag secured thereto, and means including a padlock for securing said plates detachably together.

4. A license tag support for automobiles comprising a metal plate having in its face a removable panel adapted to contain an identification card, a second plate removably secured to the face of said first plate so as to cover said panel, said second plate adapted to have an official license tag secured thereto, means including slotted ears and co-operating lugs together with a locking device for securing said plate detachably together, and means for securing said first plate to the visible part of an automobile, the second plate being of a size to cover said securing means.

5. A license tag support for automobiles comprising a metal plate having in its face a removable panel adapted to contain an identification card, a second plate removably secured to the face of said first plate so as to cover said panel, said second plate having on one side a legend indicating that the car if moving is being operated without authority and having an official license tag secured to its opposite side, means for securing the first plate to a visible part of the machine, and means for securing said plates detachably together, said second means including a locking device.

6. A license tag support and theft indicator for automobiles comprising a plate having a recess therein and adapted to be secured to an automobile, an identifying device adapted to lie in said recess; a second plate having an official license secured to one side and a theft indicating legend on its other side, said plate being adapted to be reversibly secured to said first named plate and when so secured said identifying device being entirely concealed.

In testimony whereof, we hereunto affix our signatures.

DANIEL REISER.
ORIN J. REISER.